3,281,672
APPARATUS INCLUDING AN OSCILLATOR FOR DETECTING FAULTS IN COIL WINDINGS AND HAVING MEANS FOR COMPARING THE FREQUENCY AND AMPLITUDE OF THE OSCILLATOR OUTPUT SIGNAL
Shoichi Kuroda, 2-chome 23, Kamiuma, Setagaya-ku, Tokyo, Japan
Filed Nov. 17, 1965, Ser. No. 518,749
10 Claims. (Cl. 324—51)

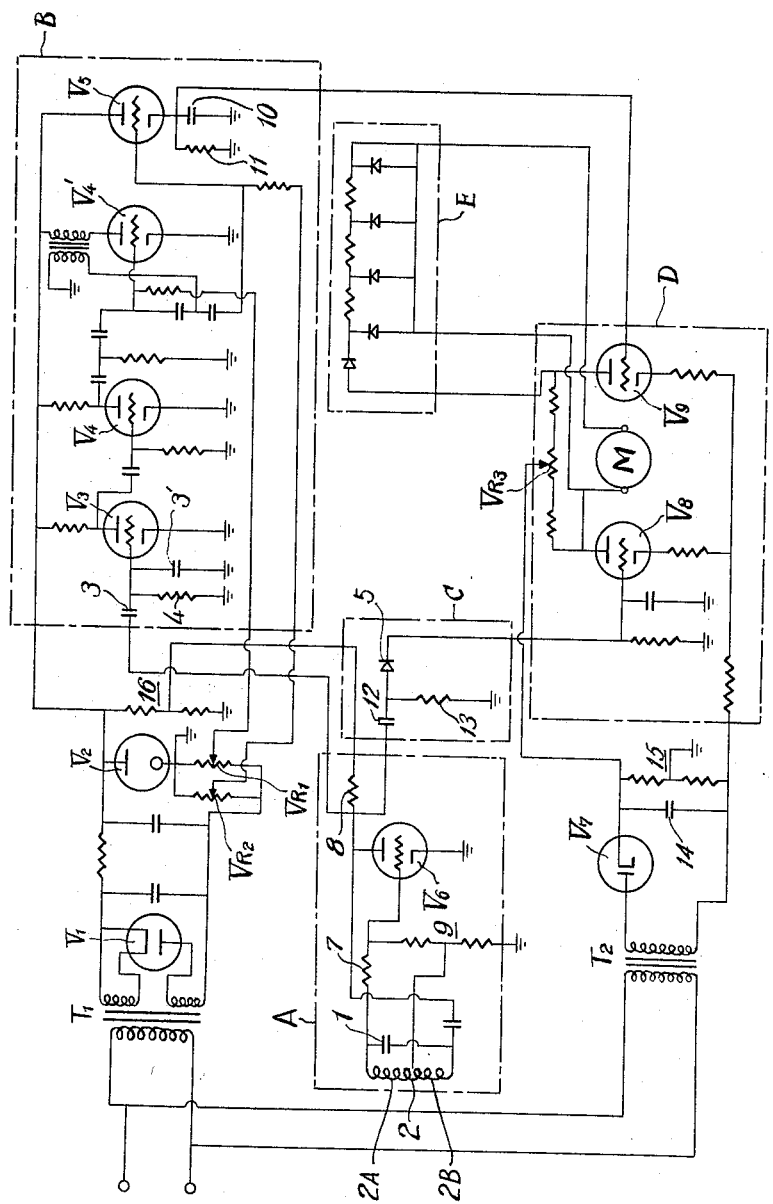

This application is a continuation-in-part of my copending application, Serial No. 222,555 filed Sept. 10, 1962, now abandoned, for "Coil Fault Finder."

The present invention relates to an electrical testing apparatus and, more particularly, to novel electrical testing apparatus for detecting faults, such as short circuits, in windings wound on paramagnetic metal cores.

An object of the present invention is to provide an electrical testing apparatus by means of which a fault in a winding, wound on an iron or other paramagnetic metal core, may be detected by detecting a variation in frequency of an oscillator circuit influenced by the winding and its core.

A further object of the invention is to provide an electrical testing apparatus for detecting a fault in a winding wound on an iron or other paramagnetic metal core, and in which the output frequency and voltage of an oscillator, which oscillator is influenced by the winding and its core, are converted into respective D.C. voltages, and the two D.C. voltages are compared in a bridge circuit whereby an unbalance of the bridge circuit will provide an indication of a fault.

Still a further object of the invention is to provide electrical testing apparatus of the mentioned type in which the oscillator is an audio frequency oscillator.

The present invention is based upon certain known electrical principles utilized in conjunction with certain newly discovered parameters of windings when inductively coupled with the tank or resonance circuit of an audio frequency oscillator. Thus, it is known to those skilled in the art that a transformer is formed by the inductive coupling of a test coil to the inductance of the tank or resonance circuit of an audio frequency oscillator. The resonance circuit inductance acts as the primary winding of the transformer, and the test coil operates as the secondary winding, having a voltage induced thereacross by the transformer action.

Every winding has a distributed capacity acting as a capacitor. This distributed capacity absorbs the voltage induced in the test coil. The test coil also absorbs the transformer secondary current produced by the inductive coupling with the primary winding or inductance of the oscillator. As the test coil is electromagnetically coupled in parallel with the inductance of the oscillator resonance circuit, in the manner of a transformer, the distributed capacity of the test coil is added in parallel to the LC resonance circuit of the oscillator. This decreases the oscillator frequency by an amount corresponding to the distributed capacity.

As a matter of fact, if capacitors having small distributed capacity are purposely connected to opposite ends of a test coil, the resulting drop in the oscillator output frequency is proportional to the size capacitors employed. The fact that the frequency of the oscillator will decrease is demonstrated by the following resonance formulae:

(1) $$=f_o\frac{Wo}{2} \qquad Wo=\frac{1}{\sqrt{LC}}$$

As the test coil is not connected directly to the inductance of the oscillator resonance circuit, the inductance per se undergoes little change and the capacity alone is changed in the same manner as if it is added to the distributed capacity. Therefore, the following relation applies:

$$Wo=\frac{1}{\sqrt{LC+\text{coil to be measured }C}}$$

The value of $Wo$ is decreased, and the decreased value of $Wo$ in the formula $$f_o=\frac{Wo}{2\pi}$$

means that $f_o$, or the oscillator output frequency, is decreased.

As the winding per se of a winding wound on an iron core has the same properties as the winding without an iron core, it will be helpful to consider the effect of the iron core per se. If an iron core is placed close to the inductance of an audio frequency oscillator, the L of the LC resonance circuit will be increased so that the oscillator output frequency will be decreased, the energy of the inductance of the oscillator tank circuit being absorbed by eddy currents in the iron core. If reference is made to the Equations 1 above, the inductance of the iron core is, in effect, added to the oscillator tank circuit inductance. Also, the capacity of the oscillator resonance circuit is added to the capacity of the winding to be measured so that:

$$Wo=\frac{1}{\sqrt{(L+L\text{ of iron core})(C+C\text{ of coil to be measured})}}$$

Thus, the frequency is again decreased.

Turning now to the case of a shortened winding on an iron core, when the latter is in inductively coupled relation with the inductance of the reasonance circuit of an audio frequency oscillator, the secondary current will be absorbed to a considerable extent due to the short circuit in the coil. The oscillator frequency is such that the inductance of the LC resonance circuit is decreased, although by only a small amount. In effect, the shortened portion of the winding of the test core is in parallel with the inductance of the oscillator resonance circuit, and thus the inductance (L) is small. The fact that the secondary current is absorbed will be apparent from the transformer formula:

$$I_2=\frac{E_2}{\sqrt{(R+r_2)^2+(X+x_2)^2}}$$

In the above formula, $r_2$ and $x_2$ denote the resistance and reactance of copper wires and are so small that they may be disregarded. Hence, the above formula can be reduced to the following formula:

$$I_2=\frac{E}{\sqrt{R^2+X^2}}$$

In the above equation, R represents the load resistance and X the load reactance.

Because of the short circuit, the load resistance R is nearly zero. The inductance X is small when tan is about from 1 to 2. Consequently, the denominator in the above equation is small and the secondary current $I_2$ is increased. The primary current $I_1$ is obtained by dividing the secondary current $I_2$ by N which is the transformation ratio. Consequently, if the secondary current is increased, the primary current will be increased even more. The present invention is based upon a novel use of the factors mentioned above.

For an understanding of the principles of the invention, reference is made to the following description of a typical embodiment thereof as illustrated in the accompanying drawing, in which the single figure is a schematic diagram of electrical testing apparatus embodying the invention.

Referring to the drawings, the testing apparatus includes an audio frequency oscillator A, a converter B for converting the oscillator output frequency into a corresponding D.C. voltage, a rectifier circuit C connected to the output of oscillator A to convert the oscillator output voltage into a corresponding D.C. voltage, a vacuum tube bridge D and a stabilizing circuit E for the vacuum tube bridge motor.

Audio frequency oscillator A is a feed-back oscillator including a triode valve $V_6$ and a resonance or tank circuit including a capacitor 1 and an inductance 2. Inductance 2 is divided into two sections 2A and 2B which are inductively coupled. The oscillator circuit includes a high ohmic resistance 7 connected in series with the grid of triode $V_6$, and further includes a resistance 8 connected to the anode of triode $V_6$. The grid bias is provided across a voltage divider 9.

Resistance 7, which is a high ohmic resistance, converts current changes in the winding section 2A, resulting from the inductive coupling of winding section 2A and 2B, into corresponding voltage changes. Due to its high ohmic value, resistance 7 converts relatively small current variations into relatively large voltage variations. Resistance 5 may have a value as high as 5 megohms and, for this reason, a relatively high operating potential is impressed across triode $V_6$ and the degree of amplification prerequisite for oscillation is trebled. Oscillator A is designed to have a frequency of the order of 5000 cycles.

Converter circuit B has an input connected to the anode of triode $V_6$, and this input includes capacitors 3 and 3' and a resistance 4. The input circuit supplies the sine wave input potential to amplifier valves or triodes $V_3$ and $V_4$ which are capacity coupled. The circuit including valves $V_3$ and $V_4$ is known as a limiter circuit and is used for amplification and for changing the phase angle of the sine wave by 180° to form a rectangular wave.

The output of valve $V_4$ is connected to a pulse circuit 19 which facilitates synchronization of a feed-back oscillation circuit described hereinafter. The feed back oscillation circuit includes a triode $V'_4$ which derives a sine wave of the same frequency as the signals from pulse circuit 19 and which is free from any variation of its output voltage. The output of triode $V'_4$ is coupled to a triode $V_5$ having operatively connected thereto a capacitor 10 and a resistance 11. Capacitor 10 is charged by valve $V_5$, and the charging voltage depends on the time constants of capacitor 10 and resistor 11. In effect, capacitor 10 is charged in accordance with the frequency of the sine wave input of valve $V_5$.

When the sine wave output of oscillator A is impressed on the grid of vacuum tube $V_3$, an amplifier sine wave output is produced at the anode of valve $V_3$ with the phase displaced through 180°. This sine wave output is applied to the grid of tube $V_4$ and, simultaneously with amplification of the input, the phase is displaced by 180° to form rectangular indented waves. The waves are then introduced into pulse circuit 1 to provide a series of pulses having a repetition rate equal to the output frequency of oscillator A. This series of pulses are applied to the grid of valve $V'_4$ of the feed-back oscillator and, as the feed-back oscillation is synchronized with the pulse series, a corresponding frequency is provided. The output of valve $V'_4$ is applied to the grid of valve $V_5$ which provides for capacitor 10 to charge to a voltage corresponding to the frequency and to the time constant of the capacitor and resistor.

Accordingly, irrespective of the value of the output voltage of oscillator A, a voltage proportional to the output frequency of the oscillator, as applied to the grid of valve $V_3$, is attained in the output circuit of valve $V_5$.

The circuit C for converting the oscillator output voltage into a corresponding D.C. voltage includes a capacitor 12 connected to the anode of triode $V_6$, a resistor 13, having one end grounded, and a diode 5. The oscillator output voltage is impressed across the resistor 13 and converted into a D.C. voltage by means of diode 5. Capacitor 12 isolates oscillator A from direct current.

The output of rectifier circuit C is connected to one input of the vacuum tube voltmeter D, the other input of vacuum tube voltmeter D being connected to the output of triode $V_5$. The first mentioned input includes a triode $V_8$ and the second mentioned input includes the grid of triode $V_9$. The anode voltages of triodes $V_8$ and $V_9$ are regulated by a voltage divider or gain control $VR_3$. For proper operation of the indicator motor M of the vacuum tube voltmeter D, the stabilizing circuit E, comprising plural interconnected diodes and resistors, is provided in connection with the vacuum tube voltmeter circuit.

To place the detector in operation, an A.C. potential from a commercial source, at a voltage of the order of, for example, 100 volts, is applied to step-up transformers $T_1$ and $T_2$. The secondary windings of transformer $T_1$ apply a potential across rectifier valves $V_1$ and the secondary winding of transformer $T_2$ impresses a potential across a rectifier valve $V_7$ having a capacitor 14 and a center-tapped and grounded voltage divider connected in parallel across its output. One end of voltage divider 15 is connected to gain control $VR_3$ and the other end of voltage divider 14 is connected to the cathodes of valves $V_8$ and $V_9$.

The rectified output of valve $V_1$ is smoothed by a resistor-capacitor network and applied across a voltage regulating tube $V_2$ having volume or gain controls $VR_1$ and $VR_2$ connected in its cathode circuit. Through a voltage divider 16, part of the regulated output potential of valve $V_2$ is applied, through resistance 8, as the anode voltage of oscillator valve $V_6$. The remainder of the output voltage of valve $V_2$ furnishes the anode potential for the valves of converter circuit B. It should be noted that, with respect to oscillator A and vacuum tube volt meter D, converter circuit B and rectifier circuit C are connected in parallel with each other.

The operation of the testing apparatus will now be described. When the apparatus is connected to a potential source at the terminals of the primary windings of transformers $T_1$ and $T_2$, audio frequency oscillator A oscillates at a predetermined frequency. The output of oscillator A is introduced into triode $V_9$ of vacuum tube bridge circuit D through the converter circuit B which converts the oscillator output frequency into a corresponding D.C. voltage. The output of oscillator A is also introduced into the triode $V_8$ of vacuum tube voltmeter D by the rectifier circuit C which provides a D.C. output voltage corresponding to the oscillator output voltage. Gain control $VR_3$ is adjusted until the meter of the bridge circuit reads zero, so that the bridge is balanced. For a purpose mentioned hereinafter, such balancing preferably is effected with some additional capacitance associated with the tank or resonance circuit of oscillator A.

If a perfect air core coil is now positioned adjacent inductance 2 of oscillator A, the distributed capacity of such a coil effects an absorption of energy from the oscillator tank circuit. In turn, this decreases the frequency of the oscillating circuit. The change in the current of the tank circuit is converted into a corresponding voltage by resistor 13 and introduced, through diode 5 of rectifier circuit C, into the grid of valve $V_8$ of the vacuum tube voltmeter. The oscillator frequency is applied to the input of the converter circuit B where it is converted into a D.C. voltage corresponding to the oscillator output frequency, and this D.C. voltage is applied to the grid of the other valve $V_9$ of the vacuum tube voltmeter.

If, as mentioned, an additional capacitor has been used beforehand to substitute for the distributed capacity of a coil during balancing of the vacuum tube voltmeter, the voltage drop across resistance 11 associated with valve $V_5$ and the voltage drop across resistance 13 of rectifier circuit C are such that the reading of the vacuum tube voltmeter is zero when the voltage is on a straight line representing the variation of frequency with distributed capacity as plotted against the variation of absorbed current with distributed capacitor. Thereby, the vacuum tube voltmeter reading is always zero when a perfect air core coil is tested by the circuit.

When a perfect winding wound on an iron core is placed adjacent inductance 2 of oscillator A the winding functions exactly as explained with respect to a perfect air-core winding. The iron core, however, changes the inductance of the tank circuit of oscillator A and thus lowers the oscillator output frequency. However, the iron core also absorbs power, due to eddy currents, and this lowers the oscillator output voltage correspondingly. Thereby, the iron core alone effects a balancing of the vacuum tube voltmeter D, and thus neither the iron core nor the perfect winding thereon have any effect on the reading of the vacuum tube voltmeter so that the latter still indicates zero.

However, when a short circuited winding on an iron core is brought adjacent inductance 2 of oscillator A, vacuum tube voltmeter bridge D is unbalanced. The iron core absorbs energy due to the eddy currents therein, and energy is also absorbed by the short circuit. Consequently, the output voltage of oscillator A drops substantially. However, the output frequency of oscillator A is increased due to the decrease in inductance by virtue of the short circuit. As a result, the input to vacuum tube voltmeter D from rectifier C decreases, while the input to the vacuum tube volt meter from converter circuit B increases. This effects a wide deflection of the pointer of the vacuum tube voltmeter. Thereby, the existence of a short in a winding wound on an iron core can be readily determined by the detector circuit of the invention.

While a specific embodiment of the invention has been shown and described in detail to illustrate the application of the principles of the invention, it will be understood that the invention may be embodied otherwise without departing from such principles.

What is claimed is:

1. Apparatus for detecting faults in coils wound on paramagnetic metal cores comprising, in combination, an oscillator having a resonance circuit including an inductance and a capacitance and determining the oscillator output signal frequency; means applying an operating potential to said oscillator; said oscillator having an output; converter means having an input connected to the output of said oscillator and operable to produce a first D.C. output voltage corresponding solely to the frequency of the output signal of said oscillator; rectifier means having an input connected to the oscillator output in parallel with the input of said converter means, and operable to produce a second D.C. output voltage corresponding solely to the amplitude of the oscillator output signal; a comparison bridge having first and second inputs; means for impressing said first D.C. output voltage on said first input and for impressing said second D.C. output voltage on said second input; and means for balancing said bridge when said oscillator is operative; whereby, when a faulty coil would on a paramagnetic metal core is placed adjacent the inductance of the resonance circuit of said oscillator, the absorption of oscillator energy due to eddy current losses in the paramagnetic metal core and due to said fault will effectively reduce the output potential of said oscillator and the decrease in inductance of the resonance circuit of said oscillator, due to the coil placed adjacent the inductance of the latter, will increase the oscillator output frequency, to effectively unbalance said comparison bridge whereby to indicate a fault in said coil wound on said paramagnetic metal core.

2. Apparatus for detecting faults in coils wound on paramagnetic metal cores, as claimed in claim 1, in which said comparison bridge includes a pair of triodes having anode-grid circuits constituting said first and second inputs; and means impressing said first and second D.C. output voltages on the respective grids of said triodes.

3. Apparatus for detecting faults in coils wound on paramagnetic metal cores, as claimed in claim 1, in which said rectifier means includes a solid state diode connected between the output of said oscillator and said second input of said comparison bridge.

4. Apparatus for detecting faults in coils wound on paramagnetic metal cores, as claimed in claim 3, in which said solid state diode is a germanium diode.

5. Apparatus for detecting faults in coils wound on paramagnetic metal cores, as claimed in claim 1, in which said converter means includes means operable to convert a sine wave input potential into a series of pulses having a repetition rate corresponding to the oscillator output frequency.

6. Apparatus for detecting faults in coils wound on paramagnetic metal cores, as claimed in claim 5, in which said converter means comprises an input circuit including capacitor means and resistance means effective to shift the phase of the sine wave input potential to said converter means.

7. Apparatus for detecting faults in coils wound on paramagnetic metal cores, as claimed in claim 6, including a two-stage amplifier following the input circuit of said converter means.

8. Apparatus for detecting faults in coils wound on paramagnetic metal cores, as claimed in claim 7, in which said converter means includes a clipper circuit connected to the output of said two-stage amplifier.

9. Apparatus for detecting faults in coils wound on paramagnetic metal cores, as claimed in claim 8, in which said converter means includes a triode having its input circuit connected to the output of said clipper circuit, and a resistance and capacitance connected in parallel to the output of said last-mentioned triode; said capacitor being charged to a voltage corresponding to the repetition rate of said pulses to produce a voltage across said resistance corresponding solely to the output frequency of said oscillator.

10. Apparatus for detecting faults in coils wound on paramagnetic metal cores, as claimed in claim 1, in which said oscillator includes a high ohmic resistance connected betwen said resonance circuit and the grid of said triode.

References Cited by the Examiner

UNITED STATES PATENTS 2,811,642  10/1957  Gabor _____ 231—15
2,970,257  1/1961   Hamft et al. _____ 324—51

WALTER L. CARLSON, *Primary Examiner.*

G. R. STRECKER, *Assistant Examiner.*